United States Patent
Lee, Jr. et al.

(10) Patent No.: US 6,480,890 B1
(45) Date of Patent: Nov. 12, 2002

(54) WORLD WIDE WEB INTERFACE TO TELECOM SERVICE CREATION ENVIRONMENT

(75) Inventors: Charles C. Lee, Jr., Plano, TX (US); Jeff J. Desando, Bolingbrook, IL (US); Scott D. Mock, San Antonio, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 703 days.

(21) Appl. No.: 08/918,383

(22) Filed: Aug. 26, 1997

Related U.S. Application Data

(60) Provisional application No. 60/048,331, filed on May 30, 1997, and provisional application No. 60/048,227, filed on May 30, 1997.

(51) Int. Cl.[7] .......................... G06F 15/16; G06F 17/60
(52) U.S. Cl. ............. 709/223; 379/201.03; 379/207.02; 709/311
(58) Field of Search ................................ 709/223, 224, 709/225, 226, 311; 379/243, 242, 244, 201.02, 201.03, 207.02

(56) References Cited

U.S. PATENT DOCUMENTS

| | | | |
|---|---|---|---|
| 5,491,796 A | * 2/1996 | Wanderer et al. | 709/102 |
| 5,495,484 A | 2/1996 | Self et al. | 370/110 |
| 5,513,171 A | * 4/1996 | Ludwiczak et al. | 370/254 |
| 5,533,116 A | * 7/1996 | Vesterinen | 379/243 |
| 5,734,831 A | * 3/1998 | Sanders | 709/223 |
| 5,742,762 A | * 4/1998 | Scholl et al. | 709/223 |
| 5,867,495 A | 2/1999 | Elliott et al. | 370/352 |
| 5,870,558 A | * 2/1999 | Branton, Jr. et al. | 709/224 |

FOREIGN PATENT DOCUMENTS

| | | | |
|---|---|---|---|
| WO | 9615616 | 5/1996 | H04M/15/00 |

OTHER PUBLICATIONS

David L. Atkins, et al., "Integrated Web and Telephone Service Creation", Bell Labs Technical Journal, vol. 2, No. 1, Jan. 1, 1997, pp. 19–35.

G.D Turner, "Service Creation", BT Technology Journal, vol. 13, No. 2, Apr. 1, 1995, pp. 80–86.

* cited by examiner

*Primary Examiner*—Dung C. Dinh
(74) *Attorney, Agent, or Firm*—Baker Botts; Richard A. Mysliwiec; V. Lawrence Sewell

(57) ABSTRACT

A web interface (12) to a service creation environment (14) includes a service logic parser (42) adapted to receive a service logic description (32) from the service creation environment (14), parse the service logic description (32), and generate a web browser readable service data file (44). At least one web page (22) is adapted to display information in the service data files (44) and prompt for user input in response thereto. A call scripting process (62) continuously receives the user inputs entered on the at least one web page (22) and communicates the user inputs to the service creation environment (14).

27 Claims, 8 Drawing Sheets

US 6,480,890 B1

WORLD WIDE WEB INTERFACE TO TELECOM SERVICE CREATION ENVIRONMENT

RELATED PATENT APPLICATIONS

This patent application claims the benefit of U.S. provisional applications serial No. 60/048,331 entitled WWW Interface to Telecom Service Creation Environment, filed on May 30, 1997, and serial No. 60/048,227 entitled System and Method for a Debit Card Telecom Service, filed on May 30, 1997.

This patent application is also related to U.S. application Ser. No. 08/918,382, entitled System and Method For a Debit Card Telecom Service filed on Aug. 26, 1997 now U.S. Pat. No. 6,282,566 incorporated herein by reference.

TECHNICAL FIELD OF THE INVENTION

This invention is related in general to the field of telecommunications equipment. More particularly, the invention is related to a World Wide Web (WWW) interface to a telecom service creation environment (SCE).

BACKGROUND OF THE INVENTION

With the advent of the Advanced Intelligent Network (AIN), many new telecommunications services have become available. These new services may include free phone, calling card, virtual net, follow me, fully flexible routing, and debit card. These services are typically defined in a service creation environment (SCE) node in the Advanced Intelligent Network by the service provider and then disseminated to the rest of the network for execution. Many of these new services provide added flexibility and convenience in how we may use our telephone equipment. However, after a customer subscribes to a new service, changes or updates to service parameters are typically done by the service provider customer support personnel who has access to the service creation environment. As a result, the service subscribers or users cannot easily update the service parameters to maximize the benefits of the services they subscribe to.

SUMMARY OF THE INVENTION

Therefore, a need has arisen for a way to allow a service subscriber to quickly and easily make changes or updates to telecommunications service parameters. In this way, the service subscriber can fully take advantage of the flexibility of telecommunications services.

In one aspect of the invention, a web interface to a service creation environment includes a service logic parser adapted to receive a service logic description from the service creation environment, parse the service logic description, and generate a web browser readable service data file. At least one web page is adapted to display information in the service data files and prompt for user input in response thereto. A call scripting process continuously receives the user inputs entered on the at least one web page and communicates the user inputs to the service creation environment.

In another aspect of the invention, a web interface to a telecommunications network includes a service logic parser adapted to parse a service logic description and generate a web browser readable service data file therefrom, and at least one web page adapted to display information in the service data files and prompt for user input in response thereto. A call scripting process is adapted to continuously receive the user inputs entered on the at least one web page and continuously communicate the user inputs to a node in the telecommunications network.

In yet another aspect of the invention, a method for providing a web interface to a service creation environment including the steps of generating a service data file describing a service in a web browser readable format, reading the service data file and constructing at least one web page for displaying information therein, prompting for and receiving user input on the at least one web page, and communicating the user input to the service creation environment.

BRIEF DESCRIPTION OF THE DRAWINGS

For a better understanding of the present invention, reference may be made to the accompanying drawings, in which.

DETAILED DESCRIPTION OF THE INVENTION

Figure 1:
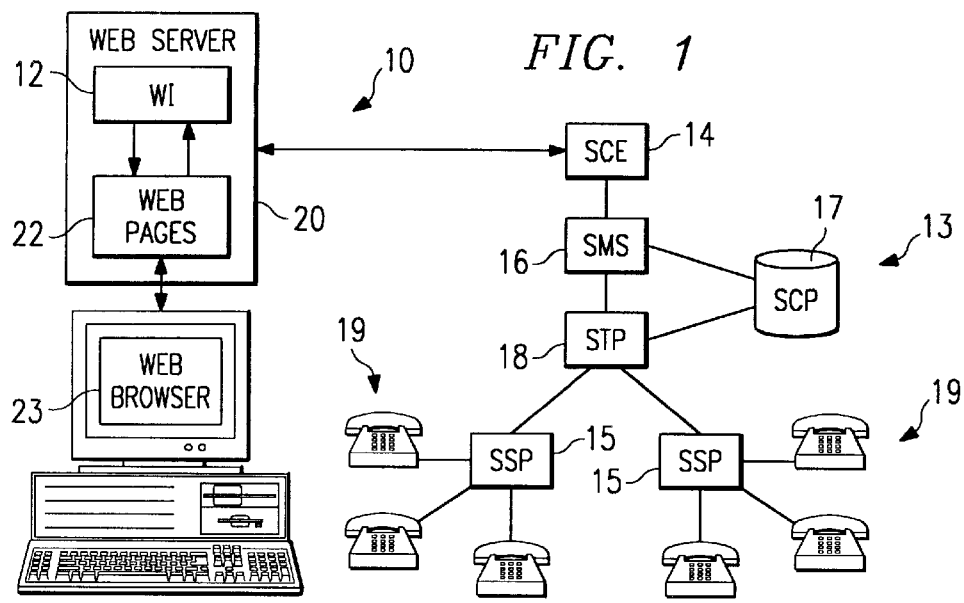
FIG. 1 is a top level block diagram of the WWW interface to a service creation environment according to an embodiment of the present invention.

The preferred embodiment(s) of the present invention is (are) illustrated in FIGS. 1–15, like reference numerals being used to refer to like and corresponding parts of the various drawings.

FIG. 1 is a top level block diagram 10 of a World Wide Web (WWW) or web interface (WI) 12 to a service creation environment (SCE) 14. Web interface 12 may reside on a web server 20 on which one or more web pages 22 are stored and accessible by a web browser 23, such as Netscape Navigator® and Microsoft Internet Explorer®. Service creation environment 14 is a part of an Advanced Intelligent Network 13, and is typically coupled to a service switching point (SSP) 15 through a service management system (SMS) 15, a service control point (SCP) 17, and a signal transfer point (STP) 18. Service switching point 15 is coupled to telephone customers and service subscribers 19. New services are defined in service creation environment 14 and then downloaded to the appropriate network nodes, such as service control point 17 and service switching point 15, for execution. Communications of control messages to download service logic programs and other data between the network nodes may follow a standard protocol, such as Signaling System No. 7 (SS7).

Service creation environment 14 is used to create service logic programs which describe the logic flow of telecommunications services such as premium rate, free phone, calling card, virtual net, fully flexible routing, and debit card. Premium rate service translates a dialed number into a network routing address after verification that the dialed number is not blocked from the call originator. The caller is then connected to the translated number and charges are billed to the caller. Free phone is a service that translates a dialed number into a network routing address, which is dependent on the first three digits of the calling party number, the day of the week, the time of day, and the specific network numbers designated by the service subscriber. The charges for the call are billed to the called party. The calling card service allows a user to enter a card number, an optional personal identification number, and destination number from the caller. The call is then completed to the collected destination number and billed to the account specified by the card number. The virtual net service gives a group of callers the perception of a private dialing plan, but public facilities owned by the network provider are used to route and connect calls. The caller dials a public access number, and a number of digits, which may be a private numbering plan (PNP) extension, a feature access code plus remaining digits, or an offnet access code plus a public number. The follow me service rolls telephone calls to a first destination number to be rolled over to a second destination number. The user may use the setup service to specify the second destination number, the number of rings at the first destination number before rolling over the call, set the time of day and day of week for the roll over telephone calls, etc. The fully flexible routing service is used to route calls to different locations depending on predefined variables. The calls may be routed depending on whether the call occurs on a weekday or during the weekend and whether the call originates from a local telephone. The call may also be routed depending on user input and the time of day. The debit card service allows a user to deposit a certain amount of funds into an account and to deduct the telephone call charges from the available funds in the account. The debit card service may be setup with an account number, add to or specify the amount of funds in the account, and activate or deactivate the service.

Figure 2:
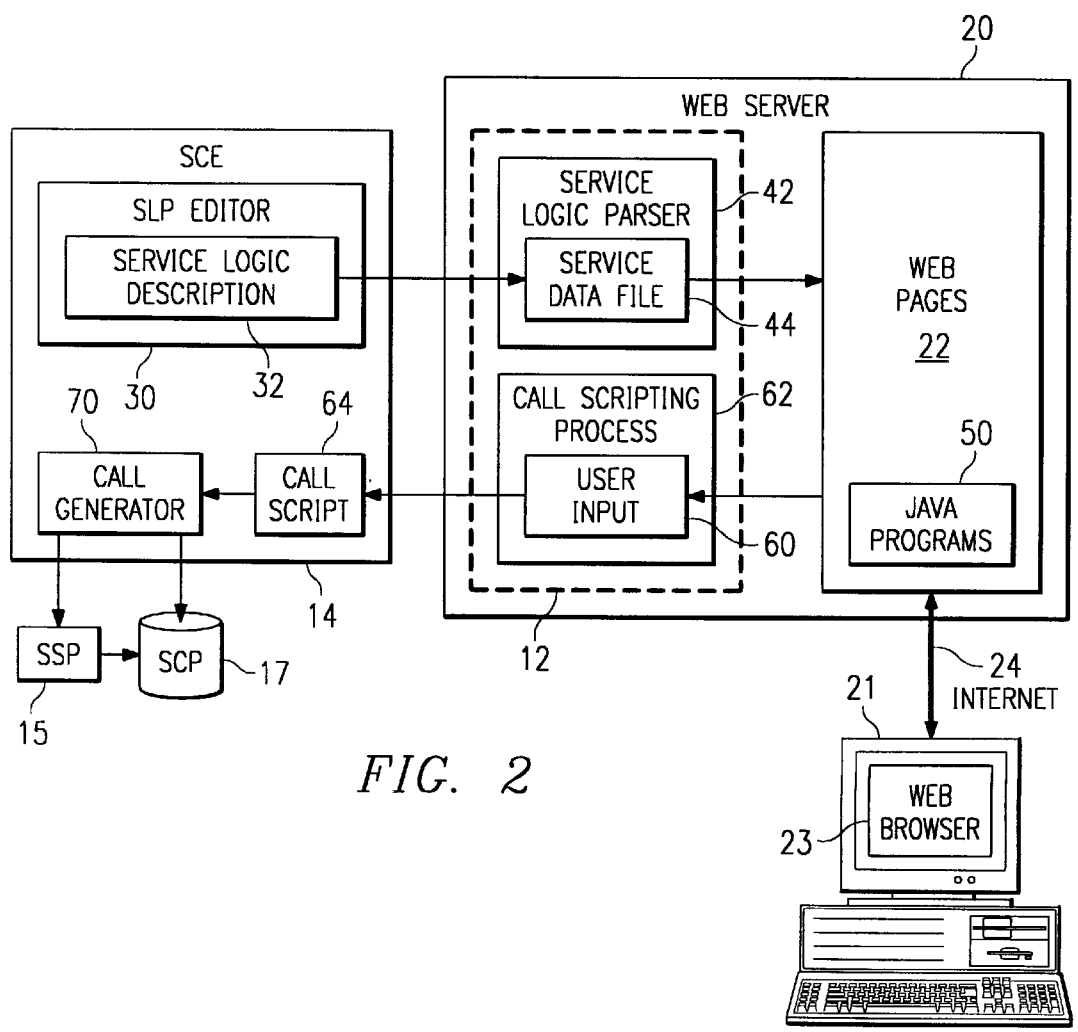
FIG. 2 is a simplified block diagram of the WWW interface to a service creation environment according to an embodiment of the present invention.

FIG. 2 is a simplified block diagram of web interface 12 to service creation environment 14. Service creation environment 14 includes a service logic program (SLP) editor 30, which is used to create a service logic description file 32 that describes the logic flow of a service. Service logic description 32 is provided, downloaded or otherwise communicated to web server 20. A service logic parser 42 of web interface 12 receives and parses service logic description file 32, and creates a service data file 44 therefrom in a web browser readable format, such as hypertext markup language (HTML). Service logic parser 42 may be coded in a scripting language such as practical extraction and report language (PERL) using the common gateway interface (CGI) standard. One or more java programs or applets 50 may be used to define the web page formats within which the HTML service data file 44 is displayed. In this manner, web pages 22 provide a graphical interface to the user and prompt the user for input used to setup, activate, deactivate, and update telecommunications services the user subscribes to. Note that java is an exemplary programming language that may be used to construct the web pages and read the HTML service data files, but other languages may also be used.

A user using a web browser 23 executing on a computer, workstation, telephone, or some other device 21 may download web pages 22 along with java programs 50 over the Internet 24. Web pages 22 display decision options, telephone keypads, and associated information to solicit and receive user input regarding service updates and changes. User inputs 60 entered via each web page 22 are received by web browser 23 and communicated back to web server 20 over the Internet 24. User inputs 60 are then continuously provided to a call scripting process 62 residing on web server 20 that reformats the user inputs and generates a call script file 64 therefrom. Call script file 64 is then transmitted to service creation environment 14. A call generator 70 residing in service creation environment 14 continuously looks for call script file 64 in predetermined locations in memory, and once one is found, sends it to service switching point 26 for execution and/or to service control point 17 to update the data stored therein. Alternatively, service switching point 26 may serve as an intermediary and communicate the update data to service control point 17. Thereafter, call generator 70 then deletes call script file 64 from memory and continues looking for the next call script file 64.

As described above, each service created and defined in service creation environment 14 has a service logic description 32 which contains all the information about the service's parameters and run format. Service logic descriptions 32 preferably follow a predefined format so that they may be correctly read and parsed by service logic parser 42. Identifiers or keywords are used in service logic descriptions 32 to identify the lines of text therein. Exemplary identifiers are listed as follows:

| | |
|---|---|
| SERVICE | name of service |
| TRIGGER | number sent to service switching point to start running the service |
| DECISION | name of page |
| BUTTON | creates a button and the associated text |
| LENGTH | display phone keypad page and specify the character length of requested user input |
| CODE | display phone keypad page and specify the exact input required from the user |
| -> | specify the next page name (specified by DECISION) to be displayed after a certain user input, e.g. LENGTH, CODE, BUTTON |

For example, a service logic description for the change database service is shown below:

| data_change.dat | |
|---|---|
| Service: | Database Change |
| Trigger: | 799555555 |
| Decision: | "Please Enter your PIN code" |
| code: | 1234 -> "Select one of the following options" |
| Decision: | "Select one of the following options" |
| button: | Destination -> "Please select a Destination" |
| button: | Flag -> "Set flag for a Destination" |
| button: | Time -> "Select a Time" |
| Decision: | "Please select a Destination" |
| button: | Destination1 -> "Please enter Destination" |
| button: | Destination2 -> "Please enter Destination" |
| Decision: | "Please enter Destination" |
| length: | 10 -> "The Database has been updated" |
| Decision: | "Set flag for a Destination" |
| button: | Destination1 -> "Select one of the following options" |
| button: | Destination2 -> "Select one of the following options" |
| Decision: | "Select a Time" |
| button: | StartTime -> "Enter start time 0000–2400" |
| button: | StopTime -> "Enter stop time 0000–2400" |
| Decision: | "Enter start time 0000–2400" |
| length: | 4 -> "Select one of the following options" |
| Decision: | "Enter stop time 0000–2400: |
| length: | 4 -> "Select one of the following options" |
| Decision: | "The Database has been updated" |

Figure 3:
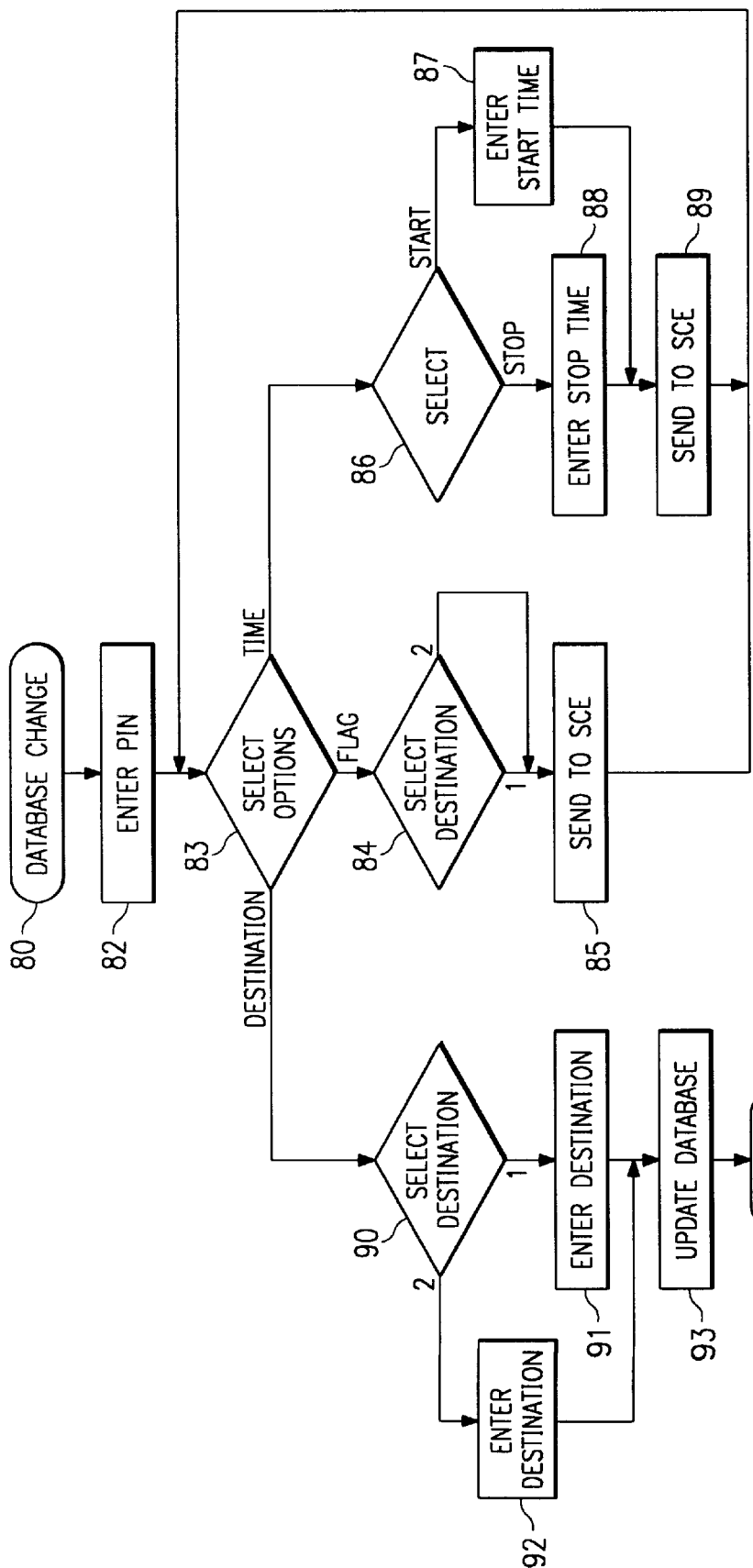
FIG. 3 is a flowchart of a database change service example according to an embodiment of the present invention.
Figure 4:
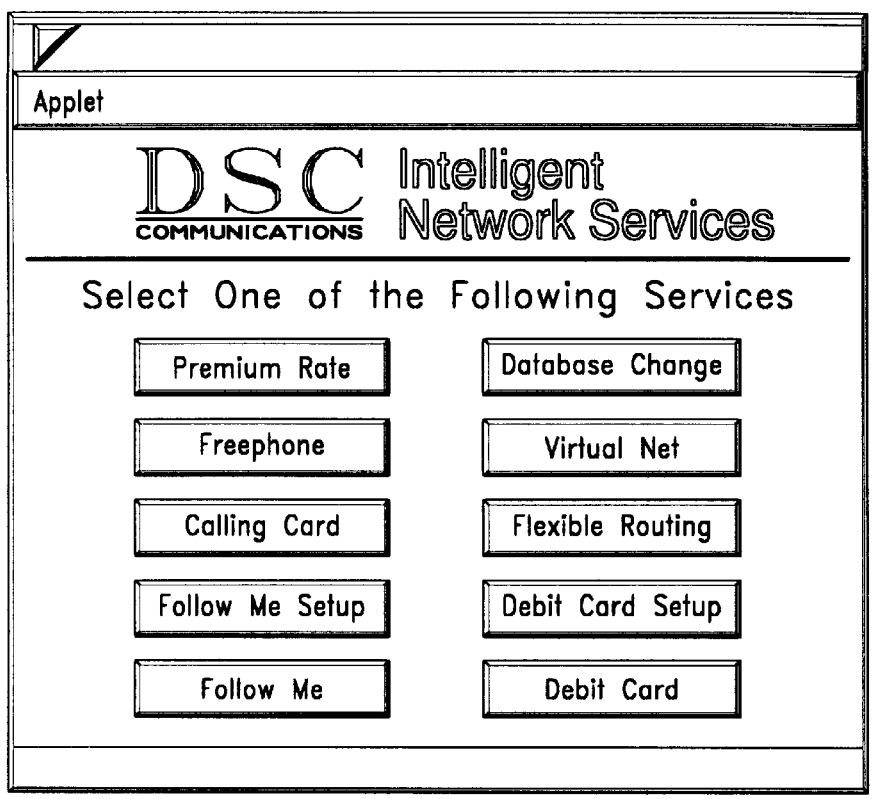
FIG. 4 is an exemplary web page providing a selection of available services according to an embodiment of the present invention.
Figure 5:
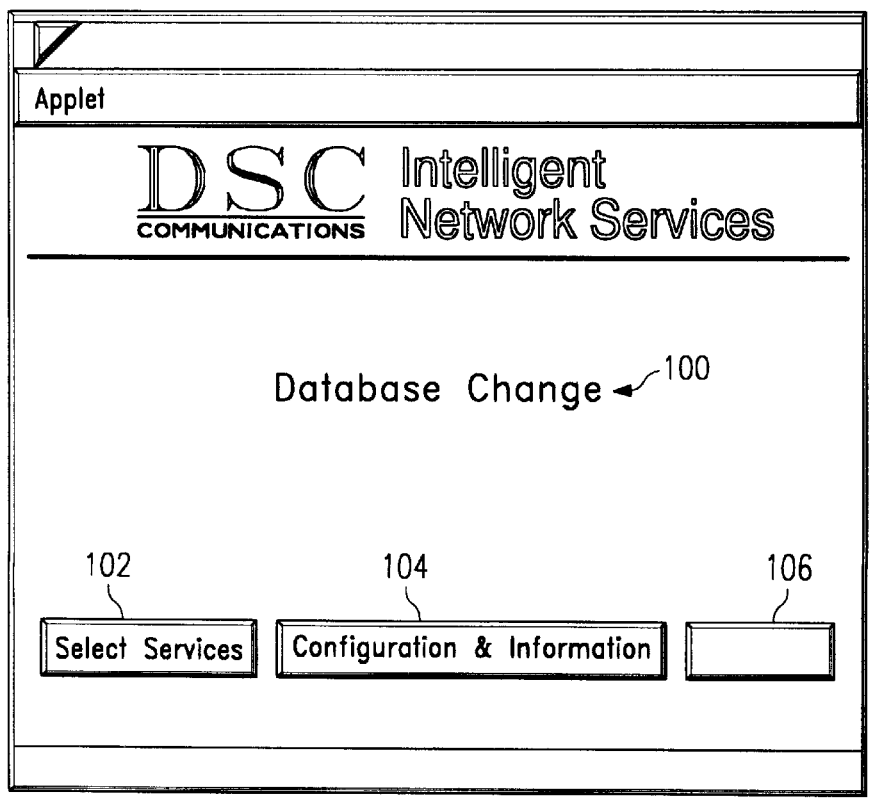
FIG. 5 is an exemplary first web page for providing a database change capability for a call rollover service constructed by a TopLevelApplet.class java program according to an embodiment of the present invention.
Figure 6:
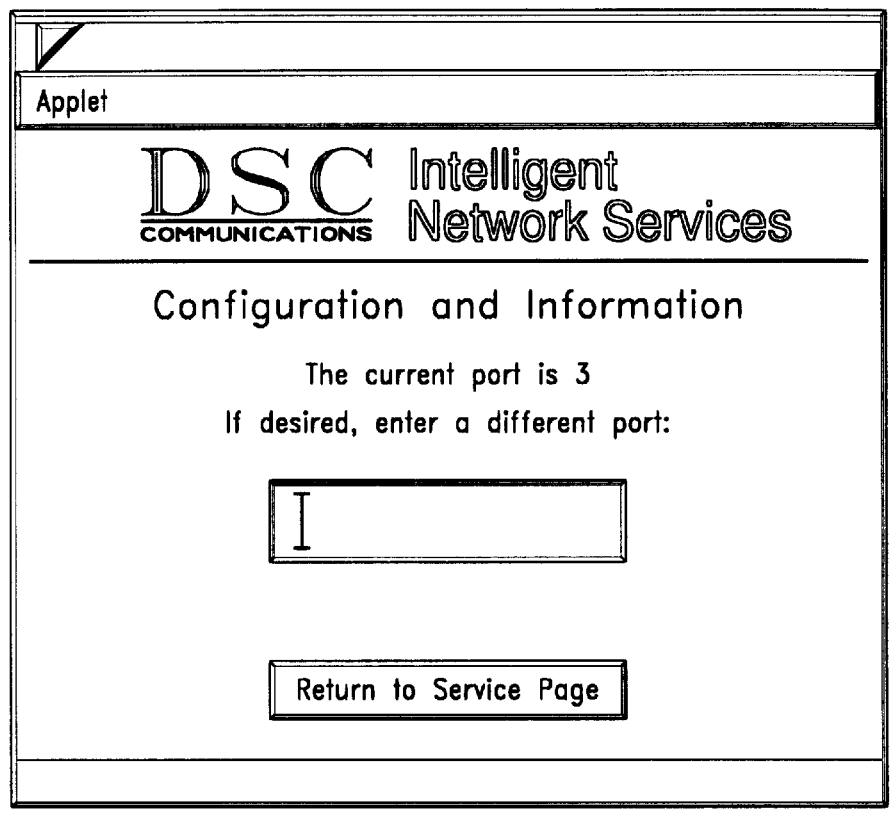
FIG. 6 is an exemplary web page prompting user input for configuration and information constructed by a ConfigApplet.class java program according to an embodiment of the present invention.

Referring also to FIG. 3 for a flowchart representation of a database change service 80 data file, the first line of the data file is flagged by the identifier SERVICE. The parameter provided: "Database Change" is read by a java program, TopLevelApplet.java, and displayed on the web page as the name of the service 100 as shown in FIG. 5. The second line provides a trigger for initiating the database service when the telephone is taken off the hook. TopLevelApplet.java provides for three buttons to be displayed at the bottom of the page: select services 102, configuration & information 104, and start service 106. Select services button 102, when selected, returns the user to a first web page which displays the services available for selection, as shown in FIG. 4. Configuration & information button 104, when chosen, displays a web page that allows the user to enter a port or telephone from which to originate the call, as shown in FIG. 6.

Figure 7:
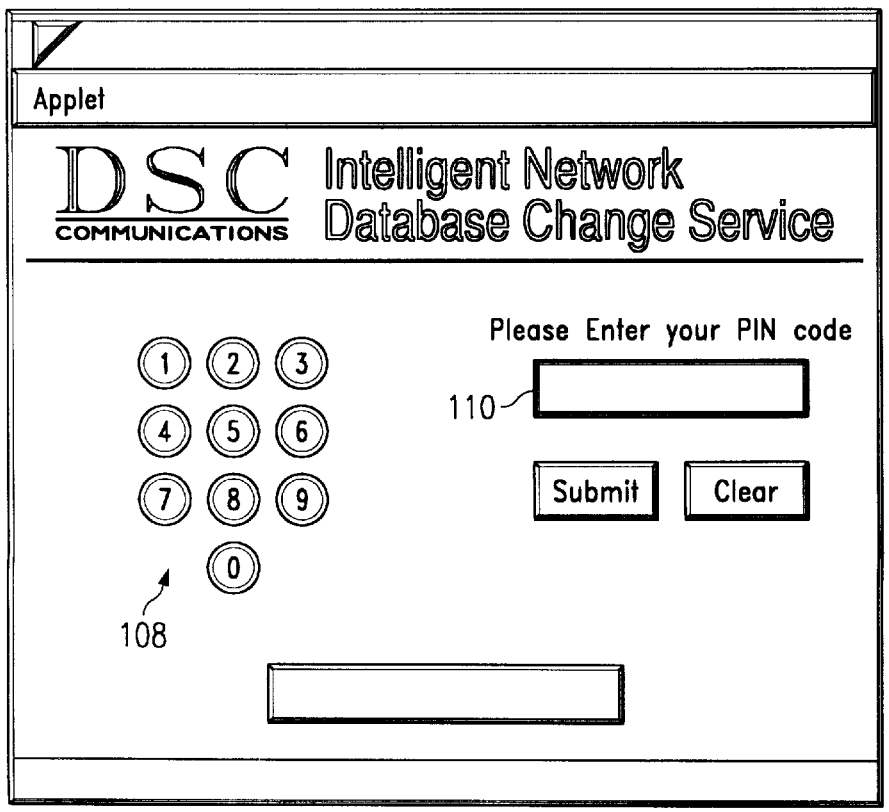
FIG. 7 is an exemplary web page of the database change service constructed by a PhoneApplet.class java program according to an embodiment of the present invention.
Figure 8:
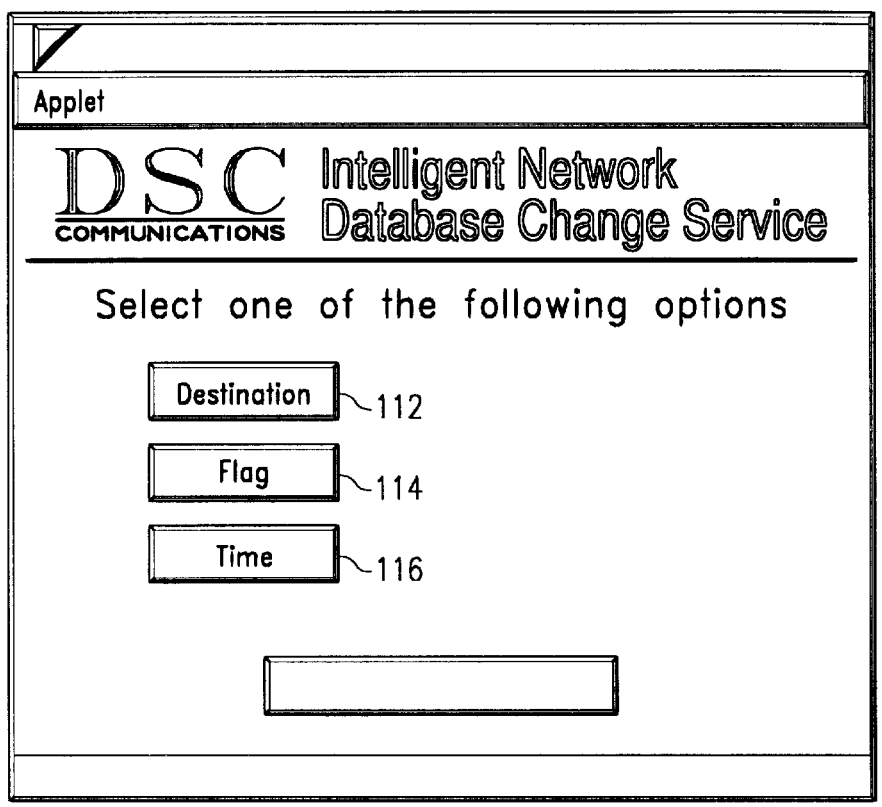
FIG. 8 is an exemplary web page for selecting a number of parameters to change of the database change service constructed by LevelApplet.class java program according to an embodiment of the present invention.

If start service button 106 were chosen, the user is prompted for a personal identification number (PIN) by a java program which is specified by the first DECISION line and the associated CODE line in the service logic description. Referring to FIG. 7, it may be seen that the parameter specified after the DECISION identifier becomes the title of the web page and the CODE identifier specifies that a PhoneApplet.java program which displays a telephone keypad 108 and a data entry field 110 be displayed to prompt for user input. If as in step 82 the user enters the correct code, in this case specified in the service logic description as "1234", the -> identifier which follows specifies the next web page to be displayed, shown in FIG. 8. Three buttons and the text to be associated with each button are specified in the service logic description: destination 112, flag 114, and time 116. A java program or applet, LevelApplet.java, which displays the title and provides for up to a maximum number of buttons may be used. This is shown as step 83 in FIG. 3.

Figure 9:
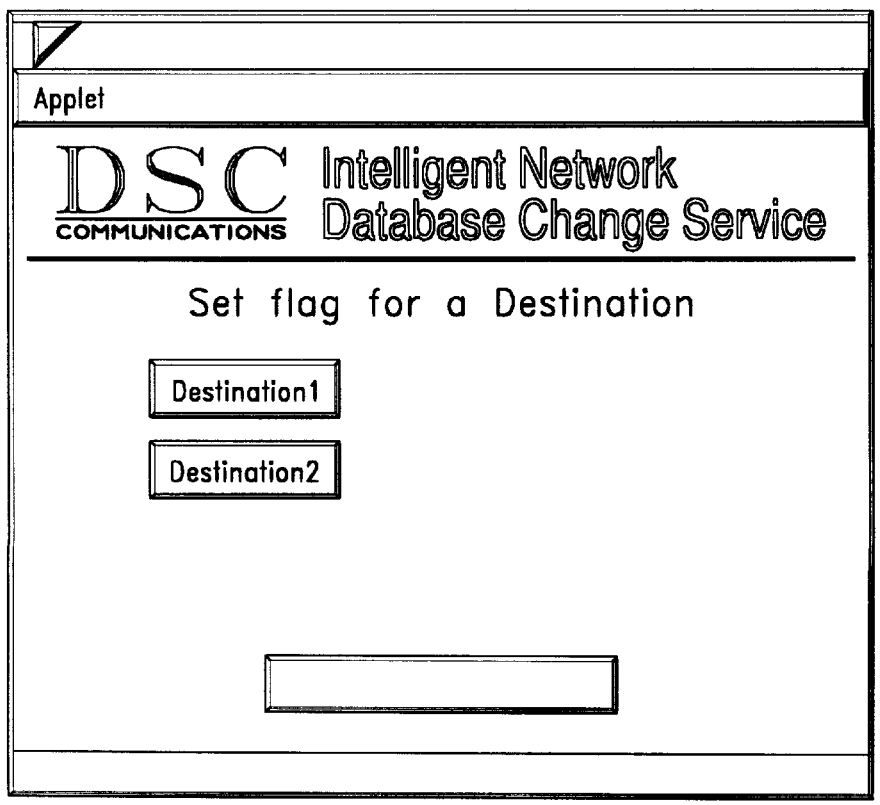
FIG. 9 is an exemplary web page for selecting a destination to set a flag for effecting call roll over of the database change service constructed by LevelApplet.class java program according to an embodiment of the present invention.

If the user selects the flag option in step 83, LevelApplet.java is used again to display the next web page, shown in FIG. 9. As specified by the next DECISION line and the associated BUTTON identifiers in the service logic description, two destinations are available for selection by the user to indicate which destination to route the calls to. When the user selects one of the destinations, as shown in step 84, the selection is sent to service creation environment 14 as in step 85. Upon selection of a destination for a flag, the web page in FIG. 8 is displayed again to allow the user to select an option, as specified in the service logic description.

Figure 10:
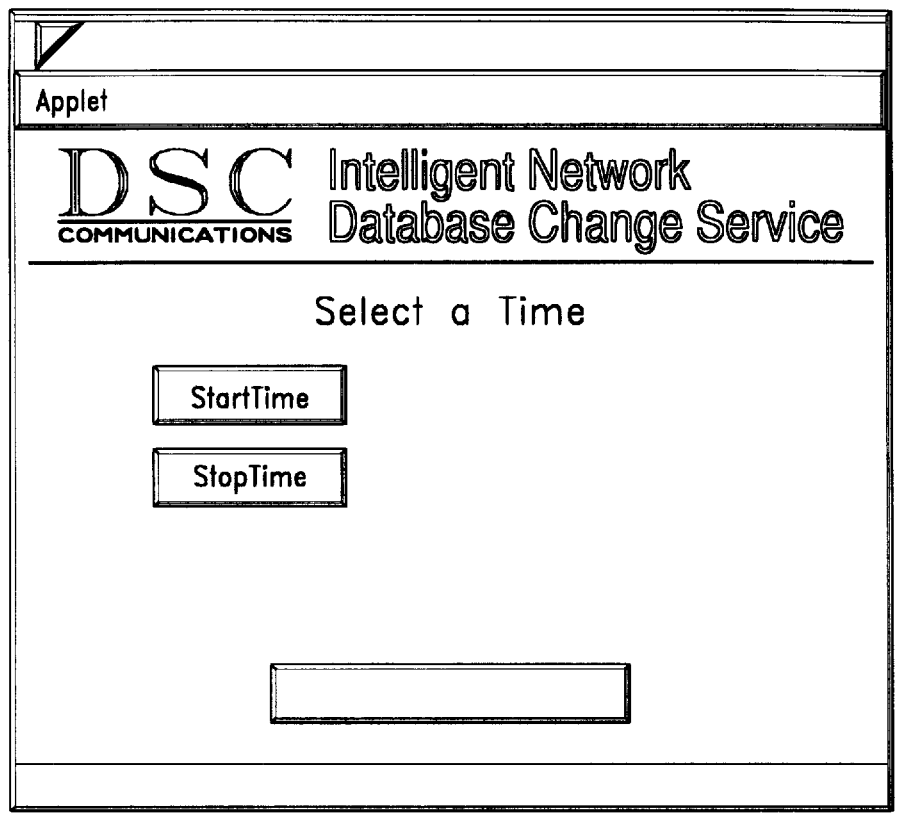
FIG. 10 is an exemplary web page for selecting the start or stop time to be specified for the call roll over service of the database change service constructed by LevelApplet.class java program according to an embodiment of the present invention.
Figure 11:
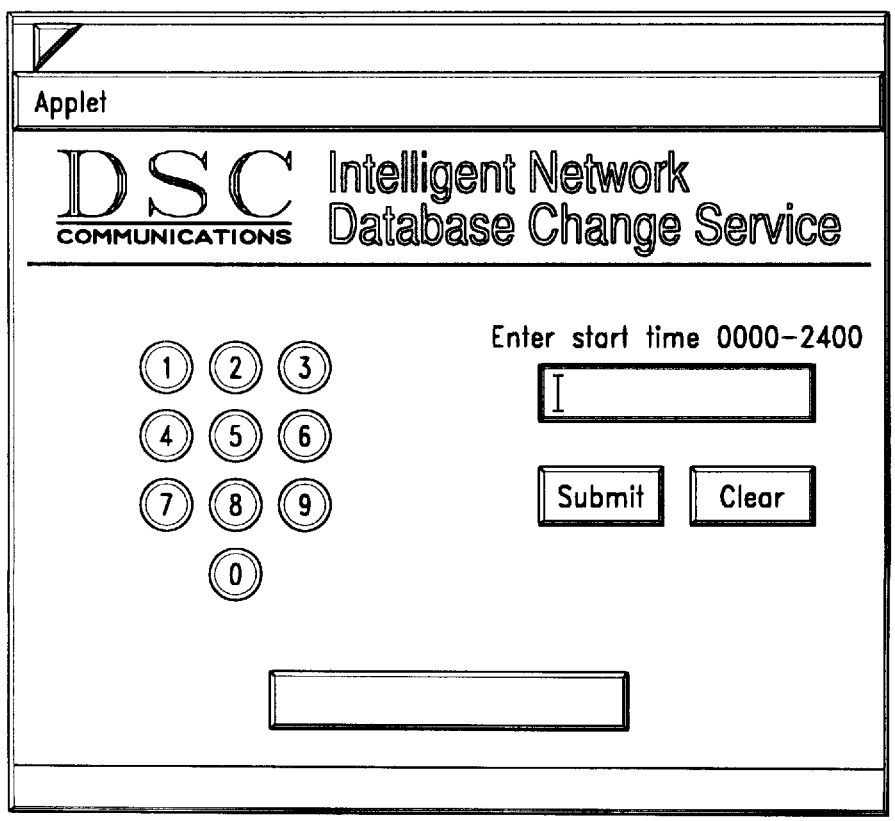
FIG. 11 is an exemplary web page for entering a start time for the call roll over service of the database change service constructed by PhoneApplet.class java program according to an embodiment of the present invention.
Figure 12:
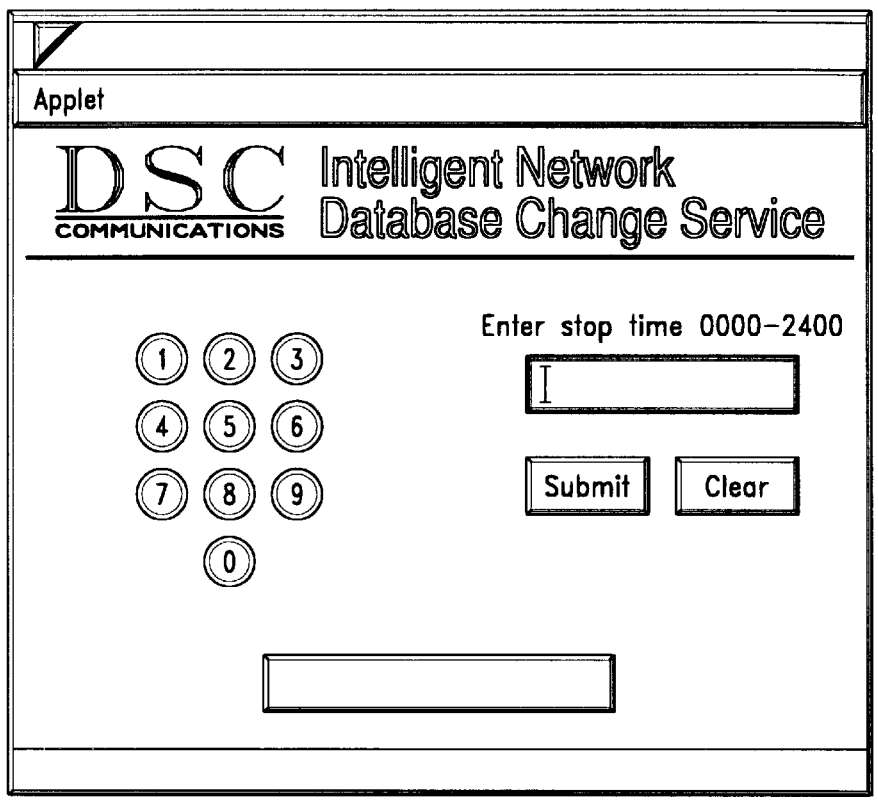
FIG. 12 is an exemplary web page for entering a stop time for the call roll over service of the database change service constructed by PhoneApplet.class java program according to an embodiment of the present invention.
Figure 13:
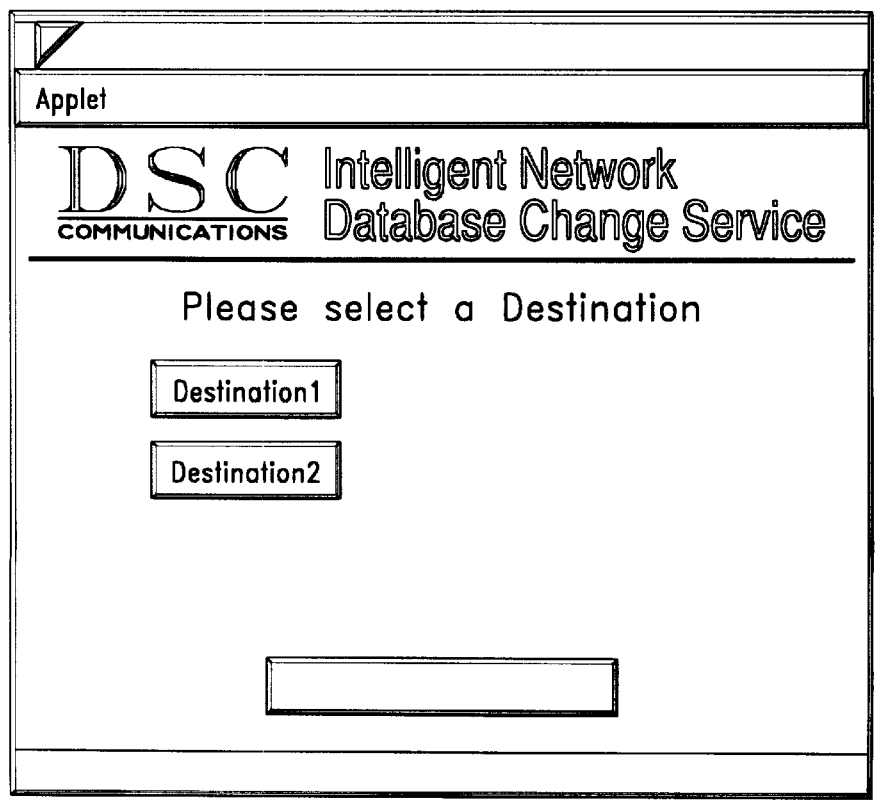
FIG. 13 is an exemplary web page for selecting a destination for the call roll over service the database change service constructed by LevelApplet.class java program according to an embodiment of the present invention.
Figure 14:
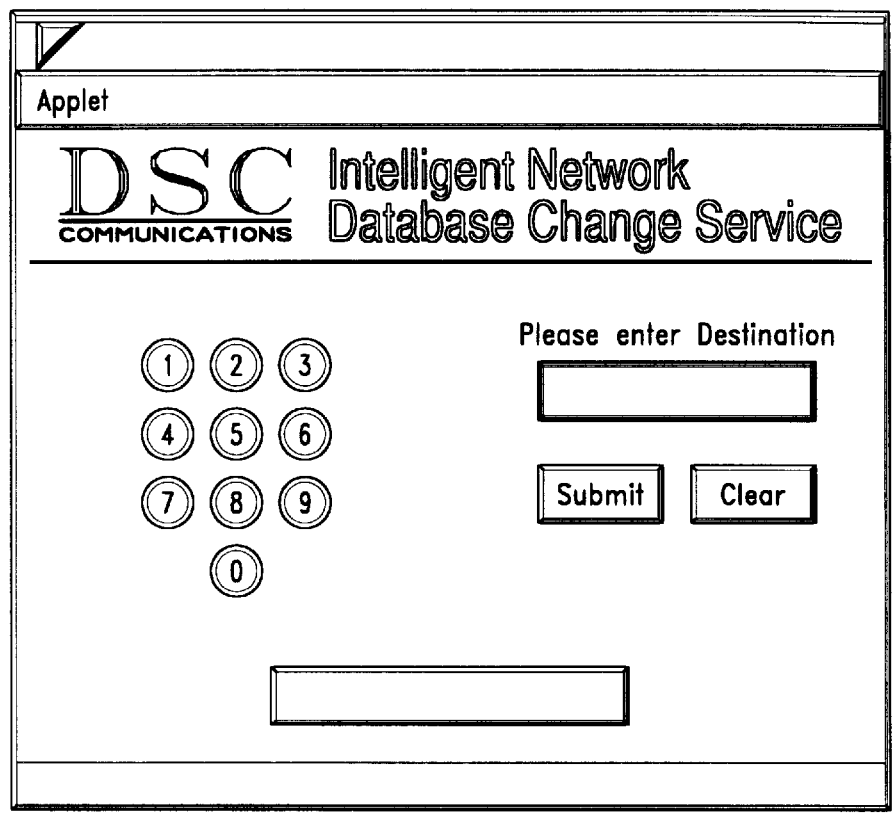
FIG. 14 is an exemplary web page for entering a specification of a destination for the call roll over service of the database change service constructed by PhoneApplet.class java program according to an embodiment of the present invention.

If in step 83 the user chooses time as the item to change, then LevelApplet.java displays a web page shown in FIG. 10 with "Select a Time" as the title and two buttons to allow the user to choose the start time or the stop time to change. This is shown as step 86 in FIG. 3. When the start time button is selected, the PhoneApplet.java web page displays the title "Enter start time 0000–2400" and a phone keypad. The LENGTH identifier specifies that the user may enter a string of length four to indicate the starting time of day to begin rolling telephone calls to a different destination. Similarly, when the stop time button is selected, the PhoneApplet.java web page displays the title "Enter stop time 0000–2400" and a phone keypad to allow the entry of stop time for rolling telephone calls to the second destination. The users enters the start and/or stop times, which is sent to service creation environment 14, as shown in steps 87–89. The web page in FIG. 3 is then displayed to allow the user to select further database change options.

Figure 15:
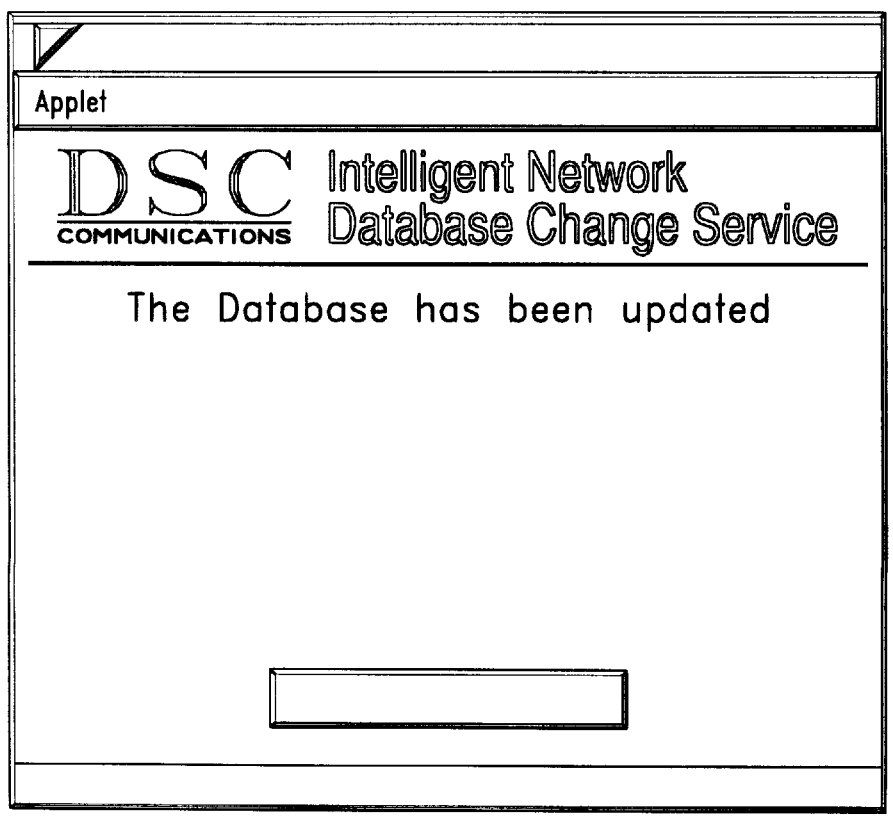
FIG. 15 is an exemplary web page of the database change service confirming that the database has been updated with user input according to an embodiment of the present invention.

The user may select the destination option at the web page in FIG. 3 and at step 83 to select the destination to which telephone calls are to be rolled over. LevelApplet.java displays a title "Please Select a Destination" and two buttons, destination 1 and destination 2, as specified by the service logic description. This is shown as step 90 in FIG. 3. Upon selection of one destination, as in steps 91 or 92, PhoneApplet.java displays the "Please enter Destination" title and a phone keypad to allow the user to enter a 10-digit destination telephone number, as specified by the service logic description. Upon submission of a 10-digit number, LevelApplet.java displays "The Database has been updated" as the title with no buttons to inform the user that the submitted number is stored in service control point 17, as shown in FIG. 15 and indicated in step 93 of the flowchart (FIG. 3). From this web page, TopLevelApplet.java is called to display the web page shown in FIG. 5, since no subsequent steps or web pages are specified by the service logic description. Therefore, the service is complete, as in step 94.

Exemplary service logic descriptions for premium rate, free phone, calling card, follow me, virtual net, flexible routing, and debit card services are provided in the appendix for reference. Premium rate service translates a dialed number into a network routing address after verification that the dialed number is not blocked from the call originator. The caller is then connected to the translated number and charges are billed to the caller. Free phone is a service that translates a dialed number into a network routing address, which is dependent on the first three digits of the calling party number, the day of the week, the time of day, and the specific network numbers designated by the service subscriber. The charges for the call are billed to the called party. The calling card service allows a user to enter a card number, an optional personal identification number, and destination number from the caller. The call is then completed to the collected destination number and billed to the account specified by the card number. The virtual net service gives a group of callers the perception of a private dialing plan, but public facilities owned by the network provider are used to route and connect calls. The caller dials a public access number, and a number of digits, which may be a private numbering plan (PNP) extension, a feature access code plus remaining digits, or an offnet access code plus a public number. The follow me service rolls telephone calls to a first destination number to be rolled over to a second destination number. The user may use the setup service to specify the second destination number, the number of rings at the first destination number before rolling over the call, set the time of day and day of week for the roll over telephone calls, etc. The fully flexible routing service is used to route calls to different locations depending on predefined variables. The calls may be routed depending on whether the call occurs on a weekday or during the weekend and whether the call originates from a local telephone. The call may also be routed depending on user input and the time of day. The debit card service allows a user to deposit a certain amount of funds into an account and to deduct the telephone call charges from the available funds in the account. The debit card service may be setup with an account number, add to or specify the amount of funds in the account, activate, and deactivate the service.

As described above, service logic description 32 of the services is parsed by service logic parser 42 and reformatted into a service data file 44 having a web browser readable format. An exemplary service data file for the database change service in hypertext markup language is shown below.

---
data_change.html
---

```
<HTML>
<HEAD>
<title>Testing</title>
</HEAD>
<BODY>
<APPLET code = "newim.class" width = 525 height = 390>
<PARAM NAME = Service_Name VALUE = "Database Change">
<PARAM NAME = Trigger VALUE=799555555>
<PARAM NAME = header1 VALUE = "Please Enter your PIN code">
<PARAM NAME = length1 VALUE = 4>
<PARAM NAME = code1 VALUE = 1234>
<PARAM NAME = next1_1 VALUE = "Select one of the following options">
<PARAM NAME = header2 VALUE = "Select one of the following option">
<PARAM NAME = button2_1 VALUE = Destination>
<PARAM NAME = next2_1 VALUE = "Please select a Destination">
<PARAM NAME = button2_2 VALUE = Flag>
<PARAM NAME = next2_2 VALUE ="Set flag for a Destination">
<PARAM NAME = button2_3 VALUE = Time>
<PARAM NAME = next2_3 VALUE = "Select a Time">
<PARAM NAME = header3 VALUE = "Please select a Destination">
<PARAM NAME = button3_1 VALUE = Destination1>
<PARAM NAME = next3_1 VALUE = "Please enter Destination">
<PARAM NAME = button3_2 VALUE = Destination2>
<PARAM NAME = next3_2 VALUE = "Please enter Destination">
<PARAM NAME = header4 VALUE = "Please enter Destination">
<PARAM NAME = length4 VALUE = 10>
<PARAM NAME = next4_1 VALUE = "The Database has been updated">
```

---
-continued data_change.html
---

```
<PARAM NAME = header5 VALUE = "Set flag for a Destination">
<PARAM NAME = button5_1 VALUE = Destination1>
<PARAM NAME = next5_1 VALUE = "Select one of the following options">
<PARAM NAME = button5_2 VALUE = Destination2>
<PARAM NAME = next5_2 VALUE = "Select one of the following options">
<PARAM NAME = header6 VALUE = "Select a Time">
<PARAM NAME = button6_1 VALUE = StartTime>
<PARAM NAME = next6_1 VALUE= "Enter start time 0000-2400">
<PARAM NAME = button6_2 VALUE = StopTime>
<PARAM NAME = next6_2 VALUE = "Enter stop time 0000-2400">
<PARAM NAME = header7 VALUE = "Enter start time 0000-2400">
<PARAM NAME = length7 VALUE = 4>
<PARAM NAME = next7_1 VALUE = "Select one of the following options">
<PARAM NAME = header8 VALUE = "Enter stop time 0000-2400">
<PARAM NAME = length8 VALUE = 4>
<PARAM NAME = next8_1 VALUE = "Select one of the following options">
<PARAM NAME = header9 VALUE = "The Database has been updated">
</APPLET>
</BODY>
</HTML>
```

Note that the applet code specified in the service data file is newsim.class, the compiled code of newsim.java. Java applet newsim.java is executed initially at the beginning of the web interface process to read in the parameters for all the web pages that are referenced by the selected service.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A web interface to a service creation environment, comprising:

a service logic parser adapted to receive a service logic description from the service creation environment, parse the service logic description, and generate a web browser readable service data file;

at least one web page adapted to display information in the service data files and prompt for user inputs from a subscriber in response thereto, wherein the user inputs include information to setup, activate, deactivate, or update telecommunications services subscribed to by the subscriber; and a call scripting process adapted to continuously receive the user inputs entered on the at least one web page and communicate the user inputs to the service creation environment in order to effect a change in services subscribed to by the subscriber.

2. The web interface, as set forth in claim 1, wherein the at least one web page comprises java programs.

3. The web interface, as set forth in claim 1, wherein the service logic parser is coded in a scripting language.

4. The web interface, as set forth in claim 1, further comprising a call generator residing in the service creation environment adapted to continuously receive the user inputs from the call scripting process and continuously communicate the user inputs to the service switching point for execution.

5. The web interface, as set forth in claim 1, further comprising a call generator residing in the service creation environment adapted to continuously receive the user inputs from the call scripting process and continuously communicate the user inputs to the service control point for database update.

6. The web interface, as set forth in claim 1, further comprising a call script file generated by the call scripting process from the user inputs and communicated to the service creation environment.

7. The web interface, as set forth in claim 1, wherein the service data file is in hypertext markup language format.

8. The web interface, as set forth in claim 1, wherein the service logic description comprises a description of a number of web pages, including title, graphical devices for receiving user input, and the logic flow of the web pages.

9. The web interface, as set forth in claim 1, further comprising a web browser executing on a user device adapted to receive the at least one web page over the internet, display the at least one web page, and receive user input entered via the user device.

10. The web interface, as set forth in claim 1, wherein the service logic description describes a premium rate service.

11. The web interface, as set forth in claim 1, wherein the service logic description describes a free phone service.

12. The web interface, as set forth in claim 1, wherein the service logic description describes a calling card service.

13. The web interface, as set forth in claim 1, wherein the service logic description describes a debit card service.

14. A web interface to a telecommunications network, comprising:

a service logic parser adapted to parse a service logic description and generate a web browser readable service data file therefrom;

at least one web page adapted to display information in the service data files and prompt for user inputs from a subscriber in response thereto wherein the user inputs include information to setup, activate, deactivate and update telecommunications services subscribed to by the subscriber; and a call scripting process adapted to continuously receive the user inputs entered on the at least one web page and continuously communicate the user inputs to a node in the telecommunications network in order to effect a change in services subscribed to by the subscriber.

15. The web interface, as set forth in claim 14, wherein the at least one web page comprises at least one java applet.

16. The web interface, as set forth in claim 14, wherein the service logic parser is coded in a scripting language.

17. The web interface, as set forth in claim 14, further comprising a call generator residing in a service creation environment in the telecommunications network adapted to continuously receive the user inputs from the call scripting process and continuously communicate the user inputs to a service switching point in the telecommunications network for execution.

18. The web interface, as set forth in claim 14, further comprising a call generator residing in a service creation environment in the telecommunications network adapted to continuously receive the user inputs from the call scripting process and continuously communicate the user inputs to a service control point in the telecommunications network for database update.

19. The web interface, as set forth in claim 14, further comprising a call script file generated by the call scripting process from the user inputs and communicated to the telecommunications network node.

20. The web interface, as set forth in claim 14, wherein the service data file is in hypertext markup language format.

21. The web interface, as set forth in claim 14, wherein the service logic description comprises a description of a number of web pages, including title, graphical devices for receiving user input, and the logic flow of the web pages.

22. The web interface, as set forth in claim 14, further comprising a web browser executing on a user device adapted to receive the at least one web page over the internet, display the at least one web page, and receive user input entered via the user device.

23. The web interface, as set forth in claim 14, further comprising a web server storing the at least one web pages and executing the service logic parser and call scripting process.

24. A method for providing a web interface to a service creation environment, comprising the steps of:

generating a service data file describing a service in a web browser readable format;

reading the service data file and constructing at least one web page for displaying information therein;

prompting for and receiving user input from a subscriber on the at least one web page, the user input including information to setup, activate, deactivate, or update telecommunications services subscribed to by the subscriber; and communicating the user input to the service creation environment in order to effectuate a change in services subscribed to by the subscriber.

25. The method, as set forth in claim 24, further comprising the step of downloading the at least one web page to a user device for displaying the at least one web page and receiving the user input thereon.

26. The method, as set forth in claim 24, further comprising the steps of:

executing a web browser on a user device; and downloading the at least one web page to the user device for displaying the at least one web page and receiving the user input thereon.

27. The method, as set forth in claim 24, further comprising the step of continuously transferring the user input from the user device to the service creation environment.

\* \* \* \* \*